United States Patent
Gao et al.

(10) Patent No.: US 9,589,026 B2
(45) Date of Patent: Mar. 7, 2017

(54) METHOD AND DEVICE FOR PUSHING INFORMATION

(71) Applicant: Tencent Technology (Shenzhen) Company Limited, Shenzhen, Guangdong (CN)

(72) Inventors: Jian Gao, Guangdong (CN); Ge Chen, Guangdong (CN)

(73) Assignee: Tencent Technology (Shenzhen) Company Limited, Shenshen (CN)

( * ) Notice: Subject to any disclaimer, the term of this patent is extended or adjusted under 35 U.S.C. 154(b) by 0 days.

(21) Appl. No.: 14/653,589

(22) PCT Filed: Oct. 8, 2013

(86) PCT No.: PCT/CN2013/084828
§ 371 (c)(1),
(2) Date: Jun. 18, 2015

(87) PCT Pub. No.: WO2014/094481
PCT Pub. Date: Jun. 26, 2014

(65) Prior Publication Data
US 2016/0004700 A1    Jan. 7, 2016

(30) Foreign Application Priority Data
Dec. 21, 2012 (CN) .......................... 2012 1 0562496

(51) Int. Cl.
G06F 7/00 (2006.01)
G06F 17/30 (2006.01)
H04L 29/08 (2006.01)

(52) U.S. Cl.
CPC .... G06F 17/3053 (2013.01); G06F 17/30265 (2013.01); G06F 17/30277 (2013.01);
(Continued)

(58) Field of Classification Search
CPC ......... G06F 17/30876; G06F 17/30256; G06F 17/30899; G06F 17/3053; G06F 17/30874
(Continued)

(56) References Cited

U.S. PATENT DOCUMENTS 8,346,791 B1 * 1/2013 Shukla .............. G06F 17/30864
707/759
8,571,358 B2 * 10/2013 Zhao ................. G06F 17/30256
382/305

(Continued)

FOREIGN PATENT DOCUMENTS

| CN | 102043833 | 5/2011 |
| CN | 102436495 | 5/2012 |

(Continued)

OTHER PUBLICATIONS

Written Opinion of the International Searching Authority issued in corresponding application PCT/CN2013/084828, dated Jan. 9, 2014, pp. 1-9.

*Primary Examiner* — James Trujillo
*Assistant Examiner* — John J Morris
(74) *Attorney, Agent, or Firm* — Brinks, Gilson & Lione

(57) ABSTRACT

The present invention provides a method and device for pushing information. The method comprises: obtaining a designated query input on a web page; matching the designated query with queries in a query candidate set including queries having a tendency of carrying an image; and when a query in the query candidate set matches the designated query, outputting a corresponding image on the web page according to the designated query.

10 Claims, 3 Drawing Sheets

(52) U.S. Cl.
CPC .. *G06F 17/30867* (2013.01); *G06F 17/30876* (2013.01); *H04L 67/02* (2013.01)

(58) Field of Classification Search
USPC ............... 707/728, 721, 723, 706, 759, 603
See application file for complete search history.

(56) References Cited

U.S. PATENT DOCUMENTS

| | | | | |
|---|---|---|---|---|
| 2010/0325105 | A1* | 12/2010 | Guo | G06F 17/30899 707/723 |
| 2014/0095427 | A1* | 4/2014 | Fox | G06F 17/30864 707/603 |
| 2015/0161125 | A1* | 6/2015 | Fu | G06F 17/3053 707/706 |

FOREIGN PATENT DOCUMENTS

| | | |
|---|---|---|
| CN | 102456054 | 5/2012 |
| CN | 102622417 | 8/2012 |

\* cited by examiner

METHOD AND DEVICE FOR PUSHING INFORMATION

CROSS-REFERENCE TO RELATED APPLICATIONS

The present application is a national phase application of PCT/CN2013/084828 under 35 U.S.C. 371, which claims the priority to Chinese Patent Application No. 201210562496.2, entitled "METHOD AND DEVICE FOR PUSHING INFORMATION", filed with the Chinese State Intellectual Property Office on Dec. 21, 2012, which is incorporated by reference in its entirety herein.

FIELD OF THE TECHNOLOGY

The present disclosure relates to the field of communications technologies, and in particular, to a method and an apparatus for pushing information.

BACKGROUND OF THE DISCLOSURE

The development of search engines makes it more convenient for users to search for information on webpages. There is a need for a solution to provide an accurate searching result for a user.

In the existing technology, to search for a picture on a webpage, a user needs to input a query including a word "picture" or the like on a search engine. For example, to browse a picture of the Forbidden City, the user needs to input a character string such as "picture of Forbidden City"; and the search engine obtains the query input on the webpage, queries for the picture of the Forbidden City according to the query, and outputs the picture on the webpage.

In the existing technology, in order that a search result of a picture is output, a user needs to input a query including a word "picture". However, many queries input by users do not include the word "picture". Although the queries do not include the word "picture", the users may wish to obtain search results of pictures. For example, when a user inputs "the national emblem of China", although the query does not include the word "picture", the specific query suggests that the user wishes to obtain a search result of a picture of the national emblem of China. Therefore, there is a need for a solution to provide an accurate search result of a picture for a user according to a query input by the user.

SUMMARY

In order to provide a more accurate search result of a picture for a user, embodiments of the present invention provide a method and an apparatus for pushing information. The technical solutions are as follows:

According to one aspect, a method for pushing information is provided. The method includes:

obtaining a specified query input on a webpage;

matching the specified query with queries implying a picture in a query candidate set; and outputting a corresponding picture on the webpage according to the specified query when a query in the query candidate set matches the specified query.

According to another aspect, an apparatus for pushing information is provided. The apparatus includes:

an obtaining module, configured to obtain a specified query input on a webpage;

a matching module, configured to match the specified query with queries in a query candidate set, the queries in the query candidate set being queries implying pictures; and a picture outputting module, configured to output a corresponding picture on the webpage according to the specified query in the case that there is a query in the query candidate set matching the specified query.

Beneficial effects brought about by the technical solutions provided in the embodiments of the present invention are as follows: a specified query input on a webpage is obtained; the specified query is matched with queries implying pictures in a query candidate set; and when a query in the query candidate set matches the specified query, a corresponding picture is output on the webpage according to the specified query. It does not require a query including a word "picture". By matching the specified query with the queries in the query candidate set, it can be determined whether the specified query implies a picture, thereby providing a user with a more accurate search result of a picture.

BRIEF DESCRIPTION OF THE DRAWINGS

To describe the technical solutions of the embodiments of the present invention more clearly, the following briefly introduces the drawings required for describing the embodiments. Apparently, the drawings in the following description show merely a few embodiments of the present invention, and a person of ordinary skill in the art may still derive other drawings from these drawings without creative work.

DESCRIPTION OF EMBODIMENTS

To make the objective, technical solutions, and advantages of the present disclosure clearer, embodiments of the present disclosure are described in further detail with reference to drawings in the following.

Embodiment 1

Figure 1:
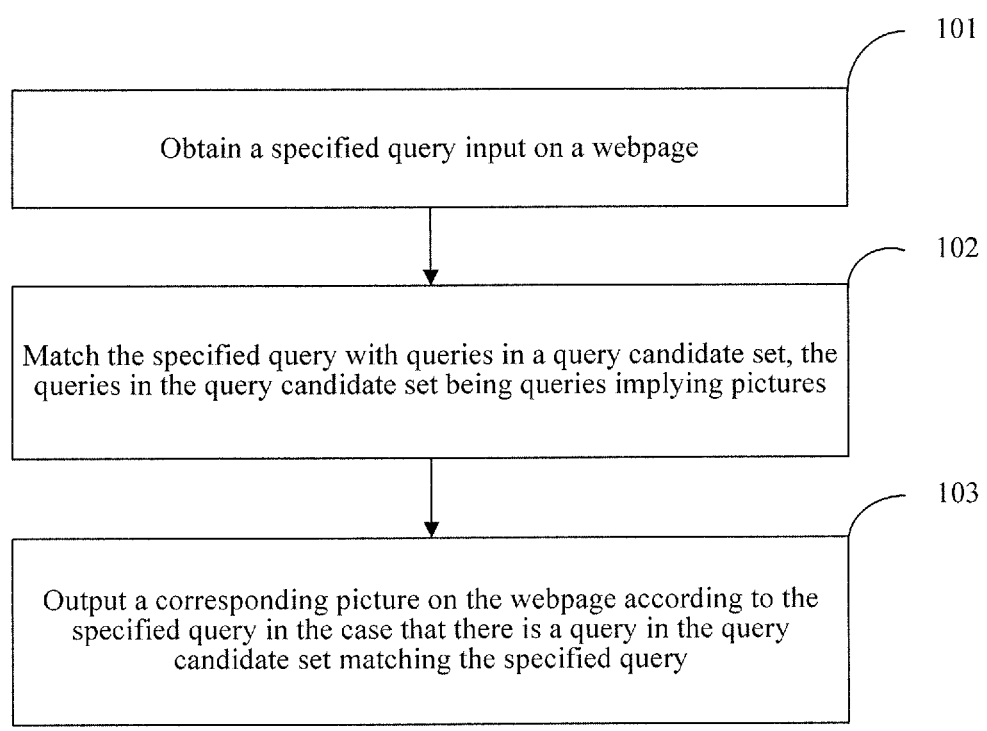
FIG. 1 is a flowchart of a method for pushing information according to Embodiment 1 of the present invention.

Referring to FIG. 1, this embodiment provides a method for pushing information, including:

101: Obtain a specified query input on a webpage.

102: Match the specified query with queries in a query candidate set, the queries in the query candidate set being queries implying pictures.

103: Output a corresponding picture on the webpage according to the specified query when a query in the query candidate set matches the specified query.

Beneficial effects of this embodiment are as follows: a specified query input on a webpage is obtained; the specified query is compared and matched with queries implying pictures in a query candidate set; and when a query in the query candidate matches the specified query, a corresponding picture is output on the webpage according to the specified query. A query does not need to include a word "picture" to search for a picture. By matching the specified query with the queries in the query candidate set, it can be determined whether the specified query implies a picture, thereby providing a user with a more accurate searching result of a picture.

Embodiment 2

Figure 2:
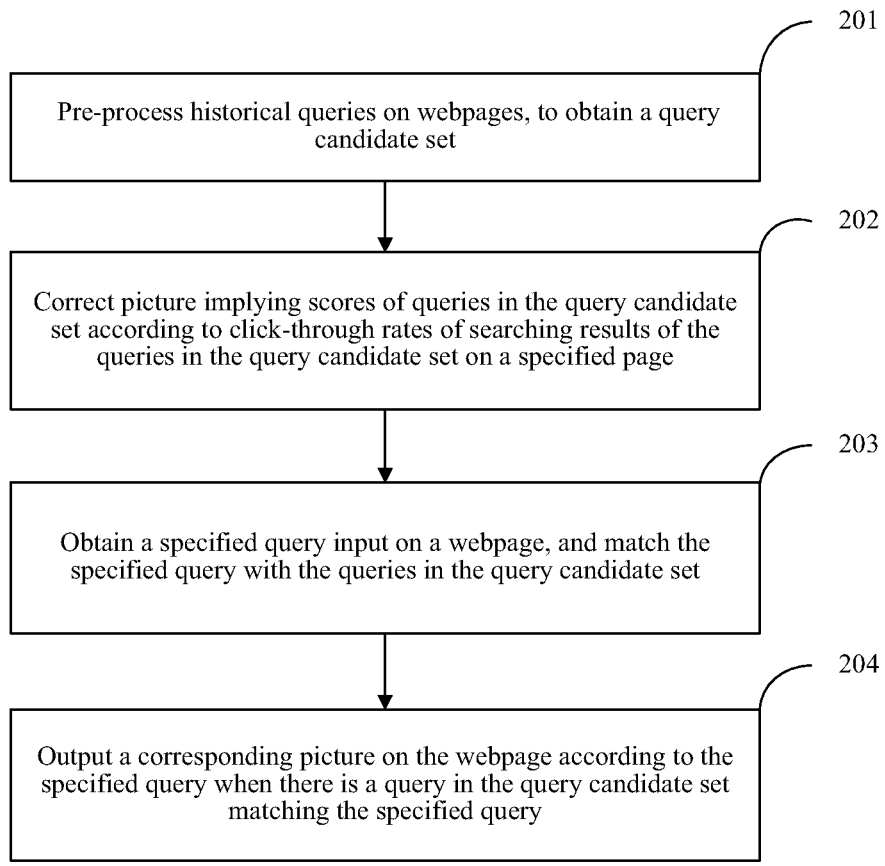
FIG. 2 is a flowchart of a method for pushing information according to Embodiment 2 of the present invention.

This embodiment of the present invention provides a method for pushing information by locating a query implying a picture from a webpage, and when a user inputs the query for searching on the webpage, a picture box is displayed on a first page of searching results, so that a user can conveniently view the picture results. A query implying a picture refers to a query that is input by user for searching when a user wishes to see a picture result and that has a tendency of carrying a picture or image. A picture box is a form of picture displaying in web searches. For example, pictures may be scaled with a ratio, and multiple pictures are horizontally displayed in a display box, or the multiple pictures are displayed vertically. A particular form of a picture box is not limited in this embodiment. Referring to FIG. 2, a process of the method includes steps 201 to 204.

201: Pre-process query history on webpages, to obtain a query candidate set.

In this embodiment, by locating queries implying pictures on webpages, and by collectively managing these queries implying pictures, picture boxes can be output accurately when users input these queries. Particularly, the pre-processing query history on webpages, to obtain a query candidate set includes:

(1) filtering query history on the webpages according to the numbers of times that a specific query is input for searching, to obtain a first candidate query set, when the number of times that each query in the first candidate query set is input for searching is greater than a first threshold;

(2) obtaining a related score of each query in the first candidate query set, and filtering queries in the first candidate query set according to the related score of each query in the first candidate query set, to obtain a second candidate query set;

(3) obtaining the number of preset keywords included in each query in the second candidate query set, and obtaining a picture implying score of each query in the second candidate query set according to a related score of each query in the second candidate query set and the number of preset keywords included in each query; and (4) adding a query in the second candidate query set into the query candidate set, if a picture implying score of the query is greater than a second threshold.

In this step, query history statistics on webpages are collected, to obtain the number of times that each query is input for searching, and queries whose search times are larger than a first threshold of times for searching are selected. The first threshold and the second threshold may be set according to experience, and are not particularly limited to that disclosed in this embodiment.

Particularly, the obtaining a related score of each query in the first candidate query set, and filtering queries in the first candidate query set according to the related score of each query in the first candidate query set, to obtain a second candidate query set includes: obtaining searching results of each query in the first candidate query set on a specified page, and extracting a title of each searching result; obtaining a related score of each query in the first candidate query set according to keywords included in each title and a location of each title, where a third threshold is added to a related score of a query if a title includes a preset keyword and a location of the title is at or in front of a first specified location among the searching results, or a fourth threshold is added to a related score of a query if a location of the title is behind the first specified location, where the third threshold is greater than the fourth threshold, and the related score of the query is summarized sequentially according to each searching result by starting from the first searching result on the specified page; and filtering the queries in the first candidate query set, discarding a query if a score of the query in the first candidate query set calculated till a second specified location is less than a fifth threshold, and discarding a query if the number of titles, which include the preset keyword, of searching results of the query on the specified page is less than a sixth threshold, to obtain the second candidate query set by the filtering.

Preferably, the specified page in this embodiment refers to the first webpage among webpages displayed when searching is performed according to a query, and a title of each searching result on the first page is captured. For example, there are 6 searching results on the first page; then a title of each searching result is captured, and whether each title includes a preset keyword is determined The preset keyword refers to a keyword implying a picture, such as national emblem or the Forbidden City. In this embodiment, the first specified location, the second specified location, the third threshold, the fourth threshold, the fifth threshold, and the sixth threshold may be set according to information about actual searches on the webpages, and are not particularly limited in this embodiment.

In order that a person skilled in this art has a better understanding of the calculation method for a related score of a query and the filtering method for the second candidate query set, the following examples are used.

The first specified location is set to 3, the second specified location is set to 5, the third threshold is set to 2, the fourth threshold is set to 1, the fifth threshold is set to 3, and the sixth threshold is set to 30%.

A query "the Forbidden City" is input for searching, and 6 searching results are obtained. A related score of the query is summarized according to each searching result by starting from a title of the first searching result on the first page, where an initial value of the related score is 0. When the title of the first searching result includes any preset keyword, 2 points are added; when a title of the second searching result includes any preset keyword, 2 points are added; when a title of the third searching result does not include any preset keyword, no point is added; when a title of the fourth searching result includes any preset keyword, 1 point is added; when a title of the fifth searching result includes any preset keyword, 1 point is added; and when a of the sixth searching result does not include any preset keyword, no point is added. Therefore, an obtained related score of the query is 6. A related score of the query on the second specified location is 6, which is greater than the fifth threshold 3. Therefore, the query is kept. Besides, the number of titles, which include the preset keyword, of searching results of the query is 4, which is greater than 30% of the total number of the titles. Therefore, the query is added to the second candidate query set.

In this embodiment, the number of preset keywords included in each query in the second candidate query set is obtained, that is, the number of preset keywords included in each query in the second candidate query set is counted.

In this step, particularly, the obtaining a picture implying score of each query in the second candidate query set according to a related score of each query in the second candidate query set and the number of preset keywords included in each query includes:

setting a picture implying score of a query in the second candidate query as zero when both a related score of the query and the number of preset keywords included in the query are equal to zero;

setting a picture implying score of a query in the second candidate query as a seventh threshold when a related score of the query is equal to zero and the number of preset keywords included in the query is greater than zero;

setting the number of preset keywords included in a query in the second candidate query as an eighth threshold when both a related score of the query and the number of preset keywords included in the query are greater than zero, and obtaining a picture implying score of the query according to 2*the eighth threshold*the related score of the query/a length of the character string of the query; and setting the number of preset keywords included in a query in the second candidate query as a ninth threshold when a related score of the query is greater than zero and the number of preset keywords included in the query is equal to zero, and obtaining a picture implying score of the query according to 2*the ninth threshold*the related score of the query/a length of the query.

In the foregoing, "*" represents a multiplication operation, and "/" represents a division operation.

In this embodiment, the seventh threshold, the eighth threshold, and the ninth threshold may be set according to information about actual searches on the webpages. According to the foregoing examples used to describe the calculation method for a related score of a query and the filtering method for the second candidate query set, the seventh threshold may be set to 1.5 herein, the eighth threshold may be set to 1.5, and the ninth threshold may be set to 1. Certainly, such a setting manner is merely described as an example, and in a particular implementation process, a setting manner is not limited in this embodiment.

In this embodiment, a maximum value and a minimum value of a related score may be further limited. For example, the maximum value of the related score is set 2, and the minimum value is set to 0.01; when a calculated related score exceeds 2, the related score is set 2; and when a calculated related score is less than 0.01, the related score is set to 0.01, so as to facilitate collective management.

202: Correct picture implying scores of queries in the query candidate set according to click-through rates of searching results of the queries in the query candidate set on a specified page.

In this embodiment, optionally, after the adding a query, in the second candidate query set, whose picture implying score is greater than a second threshold into the query candidate set, the method further includes: correcting the picture implying score of the query in the query candidate set according to click-through rates of searching results of the queries in the query candidate set on a specified page. A purpose of correcting picture implying scores is to ensure that the queries in the query candidate set are queries that actually imply pictures and to filter out queries weak in picture implication from the query candidate set.

Particularly, the correcting the picture implying score of the query in the query candidate set according to click-through rates of searching results on a specified page of searching results of the queries in the query candidate set includes: obtaining an average click-through rate of a location of each searching result on the specified page according to the click-through rates of the searching results of the queries in the query candidate set; obtaining a standard click-through rate of the location of each searching result according to the average click-through rate of the location of each searching result on the specified page; calculating a click-through rate of a searching result which is a picture on the specified page, and obtaining a specified location of the picture according to the click-through rate of the picture and the standard click-through rate of the location of each searching result on the specified page; and correcting the picture implying score of the query in the query candidate set according to the specified location of the picture and an original location of the picture.

The obtaining an average click-through rate of a location of each searching result on the specified page according to the click-through rates of the searching results of the queries in the query candidate set on the specified page includes: calculating a click-through rate of locations of all the searching results on the specified page, and dividing a click-through rate of the location of each searching result by the click-through rate of the locations of all the searching results, to obtain the average click-through rate of the location of each searching result.

Further, the obtaining a standard click-through rate of the location of each searching result according to the average click-through rate of the location of each searching result on the specified page includes: setting the standard click-through rate of the location of each searching result to t times the average click-through rate. For example, an average click-through rate of a location of the first searching result is 0.5; therefore, a standard click-through rate of the location of the searching result is 0.5t, where t is a number greater than 1, such as 1.5, 1.6, 1.8, or 2, which is not particularly limited in this embodiment.

In this embodiment, for a query for which a picture box has appeared and a click-through rate has been calculated, if the click-through rate of the query is smaller than a preset threshold, correction of a picture implying score of the query is quitted. The specified location of a picture refers to a location of a click-through rate of a searching result of a picture among standard click-through rates of locations of searching results on the specified page. For example, standard click-through rates of locations of searching results are 0.5, 0.4, 0.3, and 0.2, respectively, and a click-through rate of a searching result which is a picture is 0.36; then a specified location of the picture is a location between 0.4 and 0.3.

Further, the correcting the picture implying score of the query in the query candidate set according to the specified location of the picture and an original location of the picture includes:

obtaining an increase value for the picture implying score of the query when an original location of the picture is lower than the specified location of the picture, where the increase value is a tenth threshold*(the original location of the picture—the specified location of the picture); or obtaining a decrease value for the picture implying score of the query when the original location of the picture is higher than the specified location of the picture, where the decrease value is an eleventh threshold*(the specified location of the picture—the original location of the picture); and correcting the picture implying score according to the increase value for the picture implying score or the decrease value for the picture implying score.

In the foregoing, "*" represents a multiplication operation, and "−" represents a subtraction operation.

The increase value is added to or the decrease value is subtracted from the picture implying score, so as to correct the picture implying score, thereby obtaining an accurate query implying a picture. The tenth threshold and the eleventh threshold may be set according to information about practical searches on the webpages. For example, the eleventh threshold is set to 0.02, 0.025, or the like, and the eleventh threshold is set to 0.05, 0.055, or the like, which are not particularly limited in this embodiment.

It should be noted that steps 201 and 202 are steps that need to be performed when queries are not yet located before a user inputs a query; and if queries on webpages are already located before a user inputs a query, the steps do not need to be performed repeatedly.

203: Obtain a specified query input on a webpage, and match the specified query with the queries in the query candidate set.

In this step, after the queries on the webpages are located, when a specified query input by a user on a webpage is obtained, the specified query is matched with the queries in the query candidate set, so as to determine whether the specified query implies a picture.

The matching in this embodiment is not limited to full text-matching; and when the specified query includes a certain query in the query candidate set, or the specified query is included in a certain query in the query candidate set, it is also considered that there is a query in the query candidate set matching the specified query, which is not particularly limited in this embodiment.

204: Output a corresponding picture on the webpage according to the specified query when a query in the query candidate set matches the specified query.

In this step, when a query in the query candidate set matches the specified query, it is determined that the specified query is a character string implying a picture, and a picture box is preferably output on the first page of searching results of the specified query, so as to be browsed by the user.

When there is no query matching the specified query in the query candidate set, it is determined that the specified query is a character string that does not imply a picture, and a corresponding text searching result is output on the webpage; and details are not repeated in this embodiment.

Beneficial effects of this embodiment are as follows: a specified query input on a webpage is obtained; the specified query is matched with queries in a query candidate set, where the queries in the query candidate set are queries implying pictures; and when a query in the query candidate set matches the specified query, a corresponding picture is output on the webpage according to the specified query. A word "picture" does not need to be included in the query to search for pictures. By matching the specified query with the queries in the query candidate set, it can be determined whether the specified query implies a picture, thereby providing a user with a more accurate searching result of a picture.

A person skilled in the art can understand that the foregoing calculation methods and corresponding calculation formulas that are mentioned in Embodiment 2 are merely exemplary, and embodiments of the present invention is not limited to the foregoing particular manners mentioned in Embodiment 2.

For example, when the related score of each query is calculated, a same threshold may be set for various locations where the title is located at the searching results, and whether the location of the title is in front of the first specified location is not distinguished, thereby obtaining the related score of the query through addition starting from each searching result on the specified page.

Besides, the calculation of a picture implying score of each query and the correction of a picture implying score of each query may also be performed in other manners, and are not limited to the foregoing manners mentioned in Embodiment 2.

Further, the query candidate set may obtained in a manner other than the foregoing pre-processing the query history on the webpages as described in Embodiment 2, for example, obtained by analyzing records including "picture" in historical searches of each query.

Embodiment 3

Figure 3:
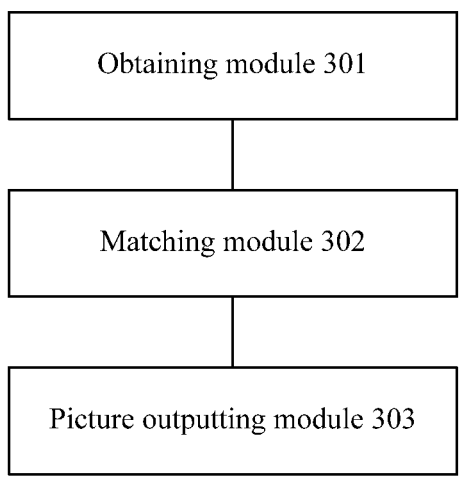
FIG. 3 is a schematic structural diagram of an apparatus for pushing information according to Embodiment 3 of the present invention.

Referring to FIG. 3, this embodiment of the present invention provides an apparatus for pushing information. The apparatus includes: an obtaining module 301, a matching module 302, and a picture outputting module 303, where the obtaining module 301 is configured to obtain a specified query input on a webpage;

the matching module 302 is configured to match the specified query with queries in a query candidate set, the queries in the query candidate set being queries implying a picture; and the picture outputting module 303 is configured to output a corresponding picture on the webpage according to the specified query when there is a query matching the specified query in the query candidate set.

Figure 4:
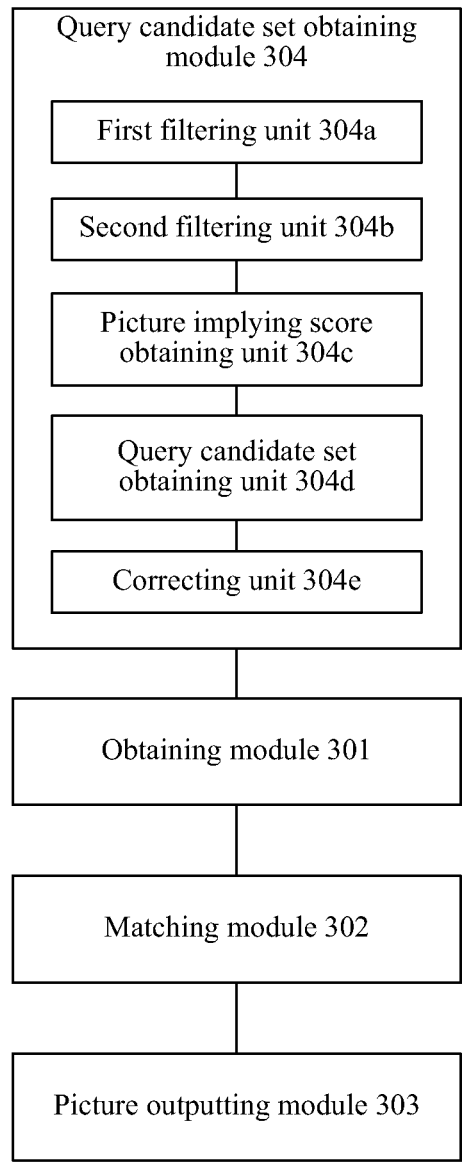
FIG. 4 is a schematic structural diagram of another apparatus for pushing information according to Embodiment 3 of the present invention.

Optionally, referring to FIG. 4, the apparatus further includes:

a query candidate set obtaining module 304, configured to: before the obtaining module 301 obtains the specified query input on the webpage, pre-process query history on webpages, to obtain the query candidate set.

Referring to FIG. 4, further, the query candidate set obtaining module 304 includes:

a first filtering unit 304*a*, configured to filter the query history on the webpages according to the numbers of times that the query history are input for searching, to obtain a first candidate query set, where the number of times that each query in the first candidate query set has been input for searching is greater than a first threshold;

a second filtering unit 304*b*, configured to obtain a related score of each query in the first candidate query set, and filter queries in the first candidate query set according to the related score of each query in the first candidate query set, to obtain a second candidate query set;

a picture implying score obtaining unit 304*c*, configured to obtain the number of preset keywords included in each query in the second candidate query set, and obtain a picture implying score of each query in the second candidate query set according to a related score of each query in the second candidate query set and the number of preset keywords included in each query; and a query candidate set obtaining unit 304*d*, configured to add a query in the second candidate query set, whose picture implying score is greater than a second threshold, into the query candidate set.

The second filtering unit 304*b* includes:

an extracting subunit, configured to obtain searching results on a specified page of searching results of each query in the first candidate query set, and extract a title of each searching result;

a related score calculating subunit, configured to obtain the related score of each query in the first candidate query set according to keywords included in each title and a location of each title, where if a title includes a preset keyword or a location of the title is at or in front of a first specified location among the searching results, a third threshold is added to a related score of the query. A fourth threshold is added to a related score of a query if a location of the title is behind a first specified location, where the third threshold is greater than the fourth threshold, and the related score of the query is summarized according to each searching result by starting from the first searching result on the specified page; and a filtering subunit, configured to filter the queries in the first candidate query set, discard a query if a score of the query in the first candidate query set on a second specified location is less than a fifth threshold, and discard a query if the number of titles, which include the preset keyword, of searching results of the query on the specified page is less than a sixth threshold, to obtain the second candidate query set after the filtering.

The picture implying score obtaining unit is configured to:

set a picture implying score of a query in the second candidate query as zero when both a related score of the query and the number of preset keywords included in the query are equal to zero;

set a picture implying score of a query in the second candidate query as a seventh threshold when a related score of the query is equal to zero and the number of preset keywords included in the query is greater than zero;

set the number of preset keywords included in a query in the second candidate query as an eighth threshold when both a related score of the query and the number of preset keywords included in the query are greater than zero, and obtain a picture implying score of the query according to 2*the eighth threshold*the related score of the query/a length of the character string of the query; and set the number of preset keywords included in a query in the second candidate query as a ninth threshold when a related score of the query is greater than zero and the number of preset keywords included in the query is equal to zero, and obtain a picture implying score of the query according to 2*the ninth threshold*the related score of the query/a length of the query.

Referring to FIG. 4, optionally, the query candidate set obtaining module 304 further includes:

a correcting unit 304e, configured to: correct the picture implying score of the query in the query candidate set according to click-through rates of searching results, on a specified page, of the queries in the query candidate set, after the query candidate set obtaining unit 304d adds the query, in the second candidate query set, whose the picture implying score is greater than the second threshold into the query candidate set,.

The correcting unit 304e includes:

an average click-through rate obtaining subunit, configured to obtain an average click-through rate of a location of each searching result on the specified page according to the click-through rates of the searching results on the specified page of the searching results of the query in the query candidate set;

a standard click-through rate obtaining subunit, configured to obtain a standard click-through rate of the location of each searching result according to the average click-through rate of the location of each searching result on the specified page;

a location obtaining subunit, configured to calculate a click-through rate of a searching result that is a picture on the specified page, and obtain a specified location of the picture according to the click-through rate of the picture and the standard click-through rate of the location of each searching result on the specified page; and a correcting subunit, configured to correct the picture implying score of the query in the query candidate set according to the specified location of the picture and an original location of the picture.

In this embodiment, the correcting subunit is configured to:

obtain an increase value for the picture implying score of the query when the original location of the picture is lower than the specified location of the picture; or obtain a decrease value for the picture implying score of the query when the original location of the picture is higher than the specified location of the picture; and correct the picture implying score according to the increase value for the picture implying score or the decrease value for the picture implying score.

Beneficial effects of this embodiment are as follows: a specified query input on a webpage is obtained; the specified query is compared and matched with queries implying pictures in a query candidate set; and when a query in the query candidate set matches the specified query, a corresponding picture is output on the webpage according to the specified query. There is no need to include a word "picture" in a query to search for a picture. By matching the specified query with the queries in the query candidate set, it can be determined whether the specified query implies a picture, thereby providing a user with a more accurate searching result of a picture.

It should be noted that in the apparatus for pushing information provided in the foregoing embodiment, the foregoing functional modules are described merely exemplarily. In practice, the foregoing functions may be allocated to different functional modules as desired, i.e., the internal structure of the apparatus is separated into functional modules to complete all or some of the above described functions.

In addition, the foregoing embodiment of the apparatus for pushing information is based on the same idea as that of the embodiments of the method for pushing information. The method embodiments can be referred to for details of the apparatus embodiment, which are not described repeatedly herein.

The sequence numbers of the foregoing embodiments of the present invention are merely for the convenience of description, and do not imply the preference among the embodiments.

A person of ordinary skill in the art can understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the essence and principle of the present disclosure shall fall within the protection scope of the present disclosure.

What is claimed is:

1. A method for pushing information, comprising:
   pre-processing historical queries on webpages, to obtain a query candidate set;
   obtaining a specified query input on a webpage;
   matching the specified query with queries in the query candidate set, the queries in the query candidate set being queries implying a picture; and
   outputting a corresponding picture on the webpage according to the specified query when there is a query in the query candidate set matching the specified query;

wherein the pre-processing historical queries on webpages, to obtain the query candidate set comprises:
filtering the historical queries on the webpages according to the numbers of times that the historical queries are input for searching, to obtain a first candidate query set, wherein the number of times that each query in the first candidate query set is input for searching is greater than a first threshold;
obtaining a related score of each query in the first candidate query set, and filtering queries in the first candidate query set according to the related score of each query in the first candidate query set, to obtain a second candidate query set;
obtaining the number of preset keywords comprised in each query in the second candidate query set, and obtaining a picture implying score of each query in the second candidate query set according to a related score of each query in the second candidate query set and the number of preset keywords comprised in each query; and
adding a query, in the second candidate query set, whose picture implying score is greater than a second threshold into the query candidate set;
wherein the obtaining a picture implying score of each query in the second candidate query set according to a related score of each query in the second candidate query set and the number of preset keywords comprised in each query comprises:
setting a picture implying score of a query in the second candidate query as zero when both a related score of the query and the number of preset keywords comprised in the query are equal to zero;
setting a picture implying score of a query in the second candidate query as a seventh threshold when a related score of the query is equal to zero and the number of preset keywords comprised in the query is greater than zero;
setting the number of preset keywords comprised in a query in the second candidate query as an eighth threshold when both a related score of the query and the number of preset keywords comprised in the query are greater than zero, and obtaining a picture implying score of the query according to a following formula:

$$\text{the picture implying score of the query} = 2 \times \text{the eighth threshold} \times \frac{\text{the related score of the query}}{\text{a length of the character string of the query}};$$

and
setting the number of preset keywords comprised in a query in the second candidate query as a ninth threshold when a related score of the query is greater than zero and the number of preset keywords comprised in the query is equal to zero, and obtaining a picture implying score of the query according to 2*the ninth threshold*the related score of the query/a length of the query.

2. The method according to claim 1, wherein the obtaining a related score of each query in the first candidate query set, and filtering queries in the first candidate query set according to the related score of each query in the first candidate query set, to obtain a second candidate query set comprises:
obtaining searching results on a specified page of searching results of each query in the first candidate query set, and extracting a title of each searching result;
obtaining the related score of each query in the first candidate query set according to keywords comprised in each title and a location of each title, wherein if a title comprises a preset keyword and a location of the title is at or in front of a first specified location among the searching results, a third threshold is added to a related score of a query, or a fourth threshold is added to a related score of a query if a location of the title is behind the first specified location, wherein the third threshold is greater than the fourth threshold, and the related score of the query is summarized according to each searching result by starting from the first searching result on the specified page; and
filtering the queries in the first candidate query set, discarding a query if a score of the query in the first candidate query set on a second specified location is less than a fifth threshold, and discarding a query if the number of titles, which comprise the preset keyword, of searching results of the query on the specified page is less than a sixth threshold, to obtain the second candidate query set after the filtering.

3. The method according to claim 1, after the adding a query, in the second candidate query set, whose picture implying score is greater than a second threshold into the query candidate set, further comprising:
correcting the picture implying score of the query in the query candidate set according to click-through rates of searching results on a specified page of researching results of the queries in the query candidate set.

4. The method according to claim 3, wherein the correcting the picture implying score of the query in the query candidate set according to click-through rates of searching results on a specified page of researching results of the queries in the query candidate set comprises:
obtaining an average click-through rate of a location of each searching result on the specified page according to click-through rates of the searching results on the specified page of search results of the queries in the query candidate set;
obtaining a standard click-through rate of the location of each searching result according to the average click-through rate of the location of each searching result on the specified page;
calculating a click-through rate of a searching result that is a picture on the specified page, and obtaining a specified location of the picture according to the click-through rate of the picture and the standard click-through rate of the location of each searching result on the specified page; and
correcting the picture implying score of the query in the query candidate set according to the specified location of the picture and an original location of the picture.

5. The method according to claim 4, wherein the correcting the picture implying score of the query in the query candidate set according to the specified location of the picture and an original location of the picture comprises:
obtaining an increase value for the picture implying score of the query when the original location of the picture is lower than the specified location of the picture; or
obtaining a decrease value for the picture implying score of the query when the original location of the picture is higher than the specified location of the picture; and
correcting the picture implying score according to the increase value for the picture implying score or the decrease value for the picture implying score.

6. An apparatus for pushing information, comprising:
a query candidate set obtaining module, configured to:
pre-process historical queries on webpages, to obtain a query candidate set;

an obtaining module, configured to obtain a specified query input on a webpage;

a matching module, configured to match the specified query with queries in the query candidate set, the queries in the query candidate set being queries implying a picture; and a picture outputting module, configured to output a corresponding picture on the webpage according to the specified query when there is a query in the query candidate set matching the specified query;

wherein the query candidate set obtaining module comprises:

a first filtering unit, configured to filter the historical queries on the webpages according to the numbers of times that the historical queries are input for searching, to obtain a first candidate query set, wherein the number of times that each query in the first candidate query set is input for searching is greater than a first threshold;

a second filtering unit, configured to obtain a related score of each query in the first candidate query set, and filter queries in the first candidate query set according to the related score of each query in the first candidate query set, to obtain a second candidate query set;

a picture implying score obtaining unit, configured to obtain the number of preset keywords comprised in each query in the second candidate query set, and obtain a picture implying score of each query in the second candidate query set according to a related score of each query in the second candidate query set and the number of preset keywords comprised in each query in the second candidate query set; and a query candidate set obtaining unit, configured to add a query, in the second candidate query set, whose picture implying score is greater than a second threshold to the query candidate set;

wherein the picture implying score obtaining unit is configured to:

set a picture implying score of a query in the second candidate query as zero when both a related score of the query and the number of preset keywords comprised in the query are equal to zero;

set a picture implying score of a query in the second candidate query set as a seventh threshold when a related score of the query is equal to zero and the number of preset keywords comprised in the query is greater than zero;

set the number of preset keywords comprised in a query in the second candidate query set as an eighth threshold when both a related score of the query and the number of preset keywords comprised in the query are greater than zero, and obtain a picture implying score of the query according to a following formula:

$$\text{the picture implying score of the query} = 2 \times \text{the eighth threshold} \times \frac{\text{the related score of the query}}{\text{a length of the character string of the query}};$$

and set the number of preset keywords comprised in a query in the second candidate query set to a ninth threshold when a related score of the query is greater than zero and the number of preset keywords comprised in the query is equal to zero, and obtain a picture implying score of the query according to 2*the ninth threshold*the related score of the query/a length of the query.

7. The apparatus according to claim 6, wherein the second filtering unit comprises:

an extracting subunit, configured to obtain searching results on a specified page of searching results of each query in the first candidate query set, and extract a title of each searching result;

a related score calculating subunit, configured to obtain the related score of each query in the first candidate query set according to keywords comprised in each title and a location of each title, wherein if a title comprises a preset keyword and a location of the title is at or in front of a first specified location among the searching results, a third threshold is added to a related score of a query, or a fourth threshold is added to a related score of a query if a location of the title is behind the first specified location, wherein the third threshold is greater than the fourth threshold, and the related score of the query is summarized according to each searching result by starting from the first searching result on the specified page; and a filtering subunit, configured to filter the queries in the first candidate query set, discard a query if a score of the query in the first candidate query on a second specified location is less than a fifth threshold, and discard a query if the number of titles, which comprise the preset keyword, of searching results on the specified page of searching results of the query is less than a sixth threshold, to obtain the second candidate query set after the filtering.

8. The apparatus according to claim 6, wherein the query candidate set obtaining module further comprises:

a correcting unit, configured to: after the query candidate set obtaining unit adds the query, in the second candidate query set, whose picture implying score is greater than the second threshold into the query candidate set, correct the picture implying score of the query in the query candidate set according to click-through rates of searching results on a specified page of searching results of the queries in the query candidate set.

9. The apparatus according to claim 8, wherein the correcting unit comprises:

an average click-through rate obtaining subunit, configured to obtain an average click-through rate of a location of each searching result on the specified page according to the click-through rates of the searching results on the specified page of searching result of the queries in the query candidate set;

a standard click-through rate obtaining subunit, configured to obtain a standard click-through rate of the location of each searching result according to the average click-through rate of the location of each searching result on the specified page;

a location obtaining subunit, configured to calculate a click-through rate of a searching result that is a picture on the specified page, and obtain a specified location of the picture according to the click-through rate of the picture and the standard click-through rate of the location of each searching result on the specified page; and a correcting subunit, configured to correct the picture implying score of the query in the query candidate set according to the specified location of the picture and an original location of the picture.

10. The apparatus according to claim 9, wherein the correcting subunit is configured to:
- obtain an increase value for the picture implying score of the query when the original location of the picture is lower than the specified location of the picture; or
- obtain a decrease value for the picture implying score of the query when the original location of the picture is higher than the specified location of the picture; and
- correct the picture implying score according to the increase value for the picture implying score or the decrease value for the picture implying score.

\* \* \* \* \*